United States Patent
Sawada

Patent Number: 5,922,114
Date of Patent: Jul. 13, 1999

[54] HOT-MELT INK COMPOSITION

[75] Inventor: Hidemasa Sawada, Gifu, Japan

[73] Assignee: Brother Kogyo Kabushiki Kaisha, Nagoya, Japan

[21] Appl. No.: 08/873,889

[22] Filed: Jun. 12, 1997

[30] Foreign Application Priority Data

Jul. 15, 1996 [JP] Japan ................................. 8-184415

[51] Int. Cl.$^6$ .................................................. C09D 11/12
[52] U.S. Cl. ..................................... 106/31.29; 106/31.61
[58] Field of Search ............................. 106/31.29, 31.61

[56] References Cited

U.S. PATENT DOCUMENTS

| | | | |
|---|---|---|---|
| 3,653,932 | 4/1972 | Berry et al. | 106/31.29 |
| 4,390,369 | 6/1983 | Merritt et al. | 106/31.3 |
| 4,659,383 | 4/1987 | Lin et al. | 106/31.29 |
| 4,758,276 | 7/1988 | Lin et al. | 106/31.29 |
| 4,820,346 | 4/1989 | Nowak | 564/169 |
| 5,000,786 | 3/1991 | Matsuzaki | 106/31.3 |
| 5,053,079 | 10/1991 | Haxell et al. | 106/31.62 |
| 5,124,719 | 6/1992 | Matsuzaki | 347/88 |
| 5,221,335 | 6/1993 | Williams et al. | 524/560 |
| 5,397,388 | 3/1995 | Fujioka | 106/31.29 |
| 5,531,819 | 7/1996 | Sawada | 106/31.3 |
| 5,624,483 | 4/1997 | Fujioka | 106/31.29 |
| 5,669,965 | 9/1997 | Sawada et al. | 106/31.29 |

FOREIGN PATENT DOCUMENTS

| | | |
|---|---|---|
| 0 610 090 A1 | 8/1994 | European Pat. Off. . |
| A-58-108271 | 6/1983 | Japan . |
| A-59-22973 | 2/1984 | Japan . |
| A-62-48774 | 3/1987 | Japan . |
| A-62-295973 | 12/1987 | Japan . |
| A-2-29471 | 1/1990 | Japan . |
| A-2-167373 | 6/1990 | Japan . |
| B2-5-5268 | 1/1993 | Japan . |

OTHER PUBLICATIONS

Dialog abstract of JP02/029471, Jan. 1990.

*Primary Examiner*—Helene Klemanski
*Attorney, Agent, or Firm*—Oliff & Berridge, PLC

[57] ABSTRACT

A hot-melt ink composition which is solid at room temperature, comprises a wax component having a melting point of about 50° C. or above, an amide resin and a colorant. As the wax component, at least one ketone wax is used.

14 Claims, 1 Drawing Sheet

HOT-MELT INK COMPOSITION

BACKGROUND OF THE INVENTION

1. Field of the Invention

This invention relates to a hot-melt ink composition used in ink-jet recording apparatus. More particularly, it relates to a hot-melt ink composition used when ink is heated to melt under conditions of a higher temperature than room temperature to make a record.

2. Description of the Related Art

As ink-jet recording systems, various systems have been proposed, e.g., what is called an electric field control system, in which electrostatic attraction is utilized to eject ink; what is called a drop on-demand system (or pressure pulse system), in which vibratory pressure of a piezoelectric device is utilized to eject ink; and what is called a thermal ink-jet system, in which a pressure produced by bubbles formed and grown by high heat is utilized to eject ink. These systems can provide very highly precise printed images.

In these ink-jet recording systems, water-based inks employing water as a main solvent and oil-based inks employing an organic solvent as a main solvent are commonly used. Printed images obtained using the water-based inks have a poor water resistance in general. On the other hand, the use of oil-based inks can provide printed images having a good water resistance.

However, these water-based inks and oil-based inks are liquid at room temperature, and hence have had disadvantages that feathering tends to occur when images are printed on recording paper and that no sufficient print density can be obtained. Also, because the inks are liquid, they tend to cause formation of deposits to cause a great lowering of the reliability of ink-jet recording systems.

In order to overcome such disadvantages of the conventional inks of a solution type, what is called hot-melt oil-based ink-jet recording ink compositions, which are solid at room temperature and melt upon heating, are proposed. Stated specifically, U.S. Pat. No. 3,653,932 discloses an ink containing a dialkyl sebacate. U.S. Pat. No. 4,390,369 and Japanese Patent Application Laid-open No. 58-108271 disclose an ink containing a natural wax. Japanese Patent Application Laid-open No. 59-22973 discloses an ink containing a stearic acid. Japanese Patent Application Laid-open No. 61-83268 discloses an ink containing an acid or alcohol having 20 to 24 carbon atoms and a ketone having a relatively higher melting point than these. Japanese Patent Application Laid-open No. 62-48774 discloses an ink containing a thermosetting resin having a high hydroxyl value, a solid organic solvent having a melting point lower than 150° C. and a small quantity of a dye substance. Japanese Patent Application Laid-open No. 2-167373 discloses an ink comprised of a colorant, a first solvent which is solid at room temperature and capable of liquefying upon heating to a temperature higher than the room temperature and a second solvent capable of dissolving the first solvent, being liquid at room temperature and being highly volatile. Also, Japanese Patent Application Laid-open No. 62-295973 discloses an ink containing a synthetic wax having a polar group and a dye soluble in the wax.

Japanese Patent Application Laid-open No. 2-29471 discloses an ink comprised of a ketone, an amide wax, a wax and a colorant.

However, none of these hot-melt ink compositions have well satisfied fundamental performances required in inks (stated specifically, ink transparency, color deterioration during storage, etc.) and good print quality. In particular, those having transparency and adhesive properties good enough to be usable for OHPs (overhead projectors) and those which can concurrently prohibit color changes during use have not been available.

SUMMARY OF THE INVENTION

The present invention was made in order to solve the above problems. Accordingly, an object of the present invention is to provide a hot-melt ink composition satisfying fundamental performances required in inks and a good print quality, having transparency and adhesive properties good enough to be usable as ink for OHPs, having a superior thermal resistance, and can form sharp colors most suited for hot-melt ink-jet recording.

To achieve this object, the present invention provides a hot-melt ink composition which is solid at room temperature, comprising a wax component having a melting point of about 50° C. or above, an amide resin and a colorant; wherein the wax component has at least one ketone wax.

The present invention also provides an ink-jet recording process comprising jetting a hot-melt ink composition to a recording medium in the form of droplets to make a record; the hot-melt ink composition being solid at room temperature and comprising a wax component having a melting point of about 50° C. or above, an amide resin and a colorant; wherein the wax component has at least one ketone wax.

This and other objects, features and advantages of the present invention are described in or will become apparent from the following detailed description of the invention.

DETAILED DESCRIPTION OF THE INVENTION

Figure 1:
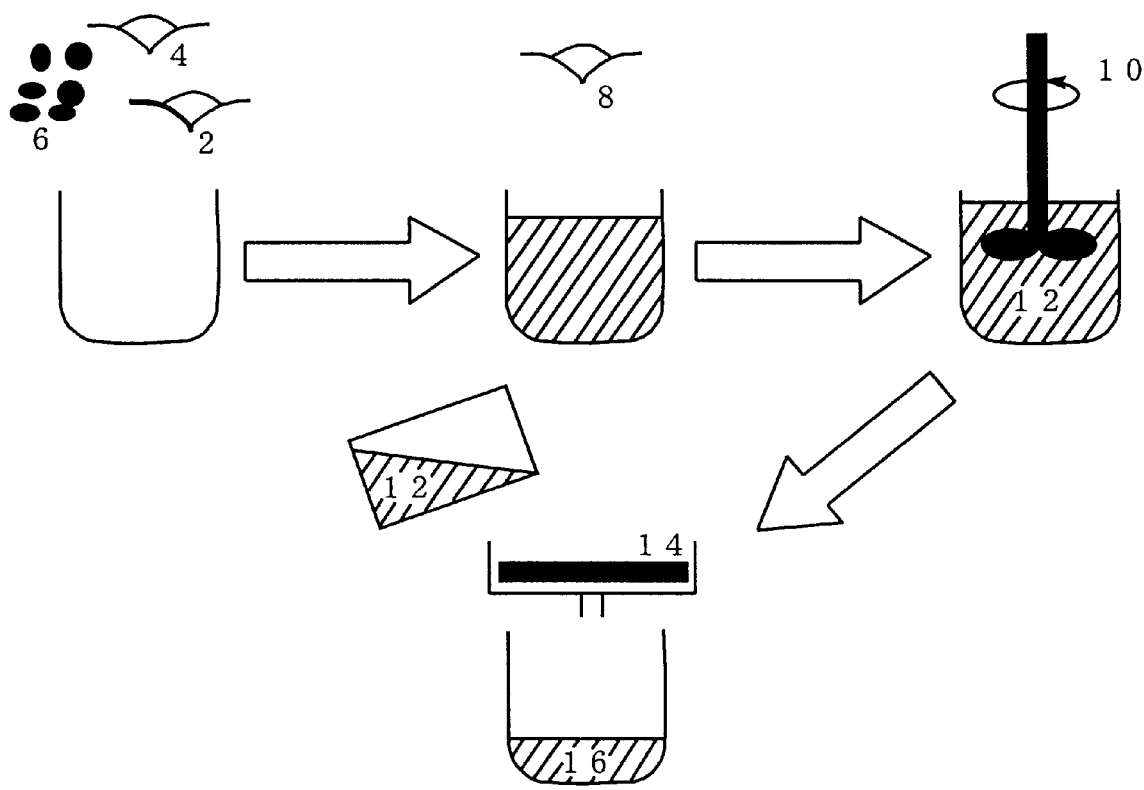
FIG. 1 illustrates a process for preparing the hot-melt ink composition of the present invention.

The hot-melt ink composition of the present invention will be first described below in detail.

The hot-melt ink composition of the present invention is solid at room temperature, comprises a wax component having a melting point of about 50° C. or above, an amide resin and a colorant, and is characterized in that the wax component has at least one ketone wax which is one of ketone compounds.

The ketone wax has, compared with waxes commonly put into wide use, the effect of lowering melt viscosity of ink and hence makes it possible to mix the amide resin in the hot-melt ink composition in a larger amount. Here, the amide resin has the action to improve the adhesive properties of the ink composition to recording mediums, and to inhibit crystallizability of the wax to improve transparency of the ink composition. Hence, the use of the ketone wax enables improvement in the transparency of the ink composition itself and also improvement in the fixing performance of ink to the recording medium. Thus, the hot-melt ink composition of the present invention can form good and sharp images not only on usual printing paper but also on OHP sheets. Moreover, it can be an ink composition preferably applicable to hot-melt ink-jet recording process for forming transparent images.

In the present invention, the wax component governs properties such as thermal properties (e.g., thermal resistance) and melt viscosity, of the hot-melt ink composition. As the wax component, waxes having a melting point of about 50° C. or above, and preferably from 50° C. to 150° C., and stable to heat may be used. Such a wax component may include, in addition to the ketone wax, conventional known waxes such as petroleum waxes, preferably paraffin wax or microcrystalline wax; vegetable waxes, preferably candelilla wax, carnauba wax, rice wax or jojoba solid wax; animal waxes, preferably beeswax, lanolin or spermaceti; mineral waxes, preferably montan wax; synthetic hydrocarbon waxes, preferably Fischer-Tropsh wax or polyethylene wax; hydrogenated waxes, preferably hardened castor oil or hardened castor oil derivatives; modified waxes, preferably montan wax derivatives or polyethylene wax derivatives; higher fatty acid waxes, preferably behenic acid, stearic acid, palmitic acid, myristic acid or lauric acid; higher alcohol waxes, preferably stearyl alcohol or behenyl alcohol; hydroxystearic acid waxes, preferably 12-hydroxystearic acid or 12-hydroxystearic acid derivatives; higher amine waxes, preferably dodecylamine, tetradecylamine or octadecylamine; ester waxes, preferably methyl stearate, octadecyl stearate, glycerol fatty ester, sorbitan fatty ester, propylene glycol fatty ester, ethylene glycol fatty ester or polyoxyethylene fatty ester; and polymer waxes, preferably α-olefin maleic anhydride copolymer wax; any of which may be used without any particular limitations.

As the ketone wax usable in the present invention, it is preferable to use at least one of stearone and laurone. The stearone is exemplified by Stearone T-1, available from Kao Corporation, and the laurone, by laurone available from Kanto Chemical Co., Inc.

The waxes other than the ketone wax may be used alone or in the form of a mixture of two or more, and may preferably be contained in the ink composition in an amount ranging from 5 to 95% by weight as the total weight of the wax component, inclusive of the ketone wax. More specifically, if the wax component is in a content less than 5% by weight, properties of other additives may come out overall and hence the ink composition may have a higher or unsettled melting point to tend to make the ink composition not sharply melt at ink-jetting temperature. Its content, however, is not limited to this lower limit when some other additive(s) is/are appropriately selected and properly used so that the melting point of these can be substantially equal to the melting point of the wax. If the wax is in a content more than 95% by weight, the ink composition may have an insufficient melt viscosity, so that it may adhere to printing paper with difficulty.

The ketone wax which is further added as the wax component may be in a content of from 20 to 50% by weight in the hot-melt ink composition, where the proportion of the ketone wax held in the wax component can be large, and hence the ink composition has a lower melt viscosity than the case when other waxes are selected, so that the amide resin can be added in a larger quantity in the ink composition when the composition is made to have a like viscosity. This brings about an increase in the transparency of the ink composition itself, and also an improvement in the fixing performance to printing paper. If the ketone wax is in a content less than 20% by weight, the action to lower the melt viscosity as stated above can not be well effective, and also it may be difficult to impart the thermal resistance that is characteristic of the present invention. If on the other hand it is in a content more than 50% by weight, the melt viscosity may be so greatly lowered that, when printed, the ink may adhere to printing paper with difficulty, and also the ketone wax may bleed to the surface to make it impossible to maintain a good print quality.

In the present invention, the amide resin has the function to endow the ink composition with the adhesive properties to printing paper, to control the viscosity of the ink composition, to inhibit the crystallizability of waxes, and also to impart transparency to the ink composition and promotes steric hindrance of pigments.

With regard to molecular weight, the amide resin may preferably have a weight average molecular weight Mw of from 500 to 500,000, more preferably from 600 to 400,000, and most preferably from 700 to 300,000, as values obtained from the results of molecular weight fractionation carried out by gel permeation chromatography or programmed-temperature gas chromatography, the former employing a differential refractometer as a detector and the latter employing a thermal conductometer as a detector.

The amide resin may preferably be contained in the ink composition in an amount ranging from 5% by weight to 60% by weight taking account of the melt viscosity of the ink composition to be produced. More specifically, if the amide resin is in a content less than 5% by weight, the ink composition can not ensure a sufficient melt viscosity required as ink and also may have no transparency. If on the other hand it is in a content more than 60% by weight, the ink composition may have a high melt viscosity to make it difficult to perform good ink ejection at operation temperature of ink-jet printer heads used in ink-jet recording.

As the colorant used in the present invention, any dyes or pigments may be used so long as they are those conventionally used in oil-based ink compositions. As to the pigments, those commonly used in the technical field of printing may be used without regard to organic or inorganic. Stated specifically, the pigments may include conventional known pigments as exemplified by carbon black, cadmium red, molybdenum red, chromium yellow, cadmium yellow, titanium yellow, chromium oxide, viridian, titanium cobalt green, ultramarine blue, Prussian blue, cobalt blue, azo pigments, phthalocyanine pigments, quinacridone pigments, isoindolinone pigments, dioxadine pigments, threne pigments, perylene pigments, perynone pigments, thioindigo pigments, quinopthalone pigments, and metal complex pigments, any of which may be used without any particular limitations.

As to the dyes, they may preferably include oil-soluble dyes such as azo dyes, metal complex dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, penoline dyes, and phthalocyanine dyes. Any of these dyes may be used in combination.

The colorant may preferably be contained in the ink composition in an amount of from 0.1% by weight to 10% by weight, more preferably from 0.5% by weight to 8% by weight also taking account of color forming performance of the printer, and still more preferably from 0.7% by weight to 5% by weight in order to ensure not to cause the deposition of dye or aggregation of pigment from the ink composition that may be caused by thermal changes when the printer is operated.

The hot-melt ink composition of the present invention as described above can be produced by mixing, with mechanical stirring, the above essential components and the optional components added as occasion calls, and filtering the resulting mixture with a membrane filter or the like to remove undissolved matter.

The hot-melt ink composition of the present invention is useful as hot-melt inks used in ink-jet recording processes of various types in which the hot-melt ink composition is jetted to a recording medium in the form of droplets to make a record. It is especially suited for an ink-jet recording process in which the hot-melt ink composition is jetted in the form of droplets by utilizing the vibration of a piezoelectric device.

EXAMPLES

The present invention will be described below in greater detail by giving Examples. The present invention is by no means limited to these Examples.

Example 1

Room-temperature solid waxes used as vehicles in Example 1 are stearone (T-1, available from Kao Corporation) and methylenebisstearic acid amide (BISAMIDE, trade name; available from Nippon Kasei Chemical Co., Ltd.). As the amide resin, SUNMIDE 550 (trade name; available from Sanwa Chemical Industries, Ltd.) is used, and as the dye, an oil-soluble dye C.I. Solvent Yellow 162 (NEOPEN YELLOW 075, trade name; available from BASF Corp.).
Ink formulation:

| T-1 | 48% by weight |
| BISAMIDE | 30% by weight |
| SUNMIDE 550 | 20% by weight |
| NEOPEN YELLOW 075 | 2% by weight |

The above hot-melt ink composition can be produced by a procedure as shown in FIG. 1.

T-1 (2), BISAMIDE (4) and SUNMIDE 550 (6) are heated and dissolved at a temperature of from 70° C. to 250° C., and preferably from 100° C. to 200° C., in approximation, and then NEOPEN YELLOW 075 (8) is mixed, which is mixed with stirring at from 200 to 10,000 r.p.m., and preferably from 500 to 5,000 r.p.m., by means of a dissolver (10). The ink composition (12) thus prepared is filtered with a 2 μm mesh filter (14) by means of a heat filtering apparatus manufactured by Toyo Roshi K.K., to obtain a final, hot-melt ink composition (16).

Viscosity of the ink composition (16) thus prepared was measured using a viscometer (DV2+, manufactured by Brookfield Co.) under conditions of 130° C. to find that it was 30.2 cP.s.

The above ink composition was put into an oven heated to 120° C. and stored for 10 days. The resulting ink composition was melted on a hot plate heated to 110° C., and then coated on an OHP sheet (PP-2500, available from Sumitomo 3M Limited) using a wire-wound rod (winding wire diameter: 0.9 mm), which was coated together with the same ink composition as the above but not stored. Color difference between both the ink films thus formed was measured using a multi-light-source spectroscopic colorimeter (MSC-5N, manufactured by Suga Shikenki K.K.) to find that ΔE was 3.65 in the L*a*b* color system.

The above ink composition was set in an ink-jet printer to print images. As a result, sharp printed images were obtained on recording paper without causing any clogging of the printer head. It was also possible to print images well on OHP sheets, and sharp projection images were obtained.

Example 2

Room-temperature solid waxes used as vehicles in Example 2 are stearyl erucic acid amide (NIKKAMIDE SE, available from Nippon Kasei Chemical Co., Ltd.) and stearone (available from Kanto Chemical Co., Inc.). As the amide resin, BIRTHAMIDE 335 (trade name; available from Henkel Hakusui Corporation) is used, and as the dye, an oil-soluble dye C.I. Solvent Blue 70 (NEOPEN BLUE 808, trade name; available from BASF Corp.).

Ink formulation:

| NIKKAMIDE SE | 18% by weight |
| Stearone | 45% by weight |
| BIRTHAMIDE 335 | 35% by weight |
| NEOPEN BLUE 808 | 2% by weight |

The above hot-melt ink composition can be produced by the same procedure as in Example 1.

The above NIKKAMIDE SE, Stearone and BIRTHAMIDE 335 are heated and dissolved at a temperature of from 70° C. to 250° C., and preferably from 100° C. to 200° C., in approximation, and then NEOPEN BLUE 808 is mixed, which is mixed with stirring at from 200 to 10,000 r.p.m., and preferably from 500 to 5,000 r.p.m., by means of the dissolver. The ink composition thus prepared is filtered with a 2 μm mesh filter by means of a heat filtering apparatus manufactured by Toyo Roshi K.K., to obtain a final, hot-melt ink composition.

Viscosity of the ink composition thus prepared was measured using a viscometer (DV2+, manufactured by Brookfield Co.) under conditions of 130° C. to find that it was 17.6 cP.s.

The above ink composition was melted on a hot plate heated to 110° C., and then coated on an OHP sheet (PP-2500, available from Sumitomo 3M Limited) using a wire-wound rod (winding wire diameter: 0.9 mm). As a result, a transparent ink film with a sharp color was obtained. Its transparency was measured using a hazometer (haze meter) (manufactured by Suga Shikenki K.K.) to find that it was 10.7%.

The above ink composition was put into an oven heated to 120° C. and stored for 10 days. The resulting ink composition was melted on a hot plate heated to 110° C., and then coated on an OHP sheet (PP-2500, available from Sumitomo 3M Limited) using a wire-wound rod (winding wire diameter: 0.9 mm), which was coated together with the same ink composition as the above but not stored. Color difference between both the ink films thus formed was measured using a multi-light-source spectroscopic calorimeter (MSC-5N, manufactured by Suga Shikenki K.K.) to find that ΔE was 4.20 in the L*a*b* color system.

The above ink composition was set in a hot-melt ink-jet printer to print images. As a result, sharp printed images were obtained on recording paper without causing any clogging of the printer head. It was also possible to print images well on OHP sheets, and sharp projection images were obtained.

Example 3

Room-temperature solid wax used as a vehicle in Example 3 is stearone (T-1, available from Kao Corporation). As the amide resin, BIRTHAMIDE 335 (trade name; available from Henkel Hakusui Corporation) is used, and as the dye, an oil-soluble dye C.I. Solvent Red 49 (NEPTUN RED BASE 543, trade name; available from BASF Corp.).

Ink formulation:

| T-1 | 50% by weight |
| --- | --- |
| BIRTHAMIDE 335 | 48% by weight |
| NEPTUN RED BASE 543 | 2% by weight |

The above hot-melt ink composition can be produced by the same procedure as in Example 1.

The above T-1 and BIRTHAMIDE 335 are heated and dissolved at a temperature of from 70° C. to 250° C., and preferably from 100° C. to 200° C., in approximation, and then NEPTUN RED BASE 543 is mixed, which is mixed with stirring at from 200 to 10,000 r.p.m., and preferably from 500 to 5,000 r.p.m., by means of the dissolver. The ink composition thus prepared is filtered with a 2 μm mesh filter by means of a heat filtering apparatus manufactured by Toyo Roshi K.K., to obtain a final, hot-melt ink composition.

Viscosity of the ink composition thus prepared was measured using a viscometer (DV2+, manufactured by Brookfield Co.) under conditions of 130° C. to find that it was 14.1 cP.s.

The ink composition was thus prepared melted on a hot plate heated to 110° C., and then coated on an OHP sheet (PP-2500, available from Sumitomo 3M Limited) using a wire-wound rod (winding wire diameter: 0.9 mm). As a result, a transparent ink film with a sharp color was obtained. Its transparency was measured using a hazometer (manufactured by Suga Shikenki K.K.) to find that it was 5.7%.

The above ink composition was put into an oven heated to 120° C. and stored for 10 days. The resulting ink composition was melted on a hot plate heated to 110° C., and then coated on an OHP sheet (PP-2500, available from Sumitomo 3M Limited) using a wire-wound rod (winding wire diameter: 0.9 mm), which was coated together with the same ink composition as the above but not stored. Color difference between both the ink films thus formed was measured using a multi-light-source spectroscopic calorimeter (MSC-5N, manufactured by Suga Shikenki K.K.) to find that ΔE was 7.20 in the L*a*b* color system.

The above ink composition was set in a hot-melt ink-jet printer to print images. As a result, sharp printed images were obtained on recording paper without causing any clogging of the printer head. It was also possible to print images well on OHP sheets, and sharp projection images were obtained.

Comparative Example 1

An ink composition in Comparative Example 1 has formulation as shown below. Room-temperature solid wax used as a vehicle is stearyl stearic acid amide (NIKKAMIDE S, available from Nippon Kasei Chemical Co., Ltd.).
Ink formulation:

| NIKKAMIDE S | 53% by weight |
| --- | --- |
| BISAMIDE | 30% by weight |
| SUNMIDE 550 | 15% by weight |
| NEOPEN YELLOW 075 | 2% by weight |

The above hot-melt ink composition of Comparative Example 1 can be produced by a procedure as shown below.

The above fatty acid amide S, BISAMIDE and SUNMIDE 550 are heated and dissolved at a temperature of from 70° C. to 250° C., and preferably from 100° C. to 200° C., in approximation, and then NEOPEN YELLOW 075 is mixed, which is mixed with stirring at from 200 to 10,000 r.p.m., and preferably from 500 to 5,000 r.p.m., by means of the dissolver. The ink composition thus prepared is filtered with a 2 μm mesh filter by means of a heat filtering apparatus manufactured by Toyo Roshi K.K., to obtain a final, hot-melt ink composition.

Viscosity of the ink composition thus prepared was measured using a viscometer (DV2+, manufactured by Brookfield Co.) under conditions of 130° C. to find that it was 40.2 cP.s.

The ink composition thus prepared was put into an oven heated to 120° C. and stored for 10 days. The resulting ink composition was melted on a hot plate heated to 110° C., and then coated on an OHP sheet (PP-2500, available from Sumitomo 3M Limited) using a wire-wound rod (winding wire diameter: 0.9 mm), which was coated together with the same ink composition as the above but not stored. Color difference between both the ink films thus formed was measured using a multi-light-source spectroscopic colorimeter (MSC-5N, manufactured by Suga Shikenki K.K.) to find that ΔE was 10.76 in the L*a*b* color system.

The ink composition thus prepared was melted on a hot plate heated to 110° C., and then coated on an OHP sheet (PP-2500, available from Sumitomo 3M Limited) using a wire-wound rod (winding wire diameter: 0.9 mm). As a result, a transparent ink film with a sharp color was obtained. Its transparency was measured using a hazometer (manufactured by Suga Shikenki K.K.) to find that it was 56.6%.

The above ink composition was set in a hot-melt ink-jet printer to print images. As a result, sharp printed images were obtained on recording paper without causing any clogging of the printer head. When printed on OHP sheets, however, prints with not so much transparency were obtained.

Comparative Example 2

An ink composition in Comparative Example 2 has Ink formulation as shown below.
Ink formulation:

| NIKKAMIDE S | 45% by weight |
| --- | --- |
| NIKKAMIDE SE | 23% by weight |
| BIRTHAMIDE 335 | 30% by weight |
| NEOPEN BLUE 808 | 2% by weight |

The above hot-melt ink composition of Comparative Example 2 can be produced by a procedure as shown below.

The above fatty acid amide S, NIKKAMIDE SE and BIRTHAMIDE 335 are heated and dissolved at a temperature of from 70° C. to 250° C., and preferably from 100° C. to 200° C., in approximation, and then NEOPEN BLUE 808 is mixed, which is mixed with stirring at from 200 to 10,000 r.p.m., and preferably from 500 to 5,000 r.p.m., by means of the dissolver. The ink composition thus prepared is filtered with a 2 μm mesh filter by means of a heat filtering apparatus manufactured by Toyo Roshi K.K., to obtain a final, hot-melt ink composition.

Viscosity of the above ink composition was measured using a viscometer (DV2+, manufactured by Brookfield Co.) under conditions of 130° C. to find that it was 24.6 cP.s.

The ink composition thus prepared was put into an oven heated to 120° C. and stored for 10 days. The resulting ink composition was melted on a hot plate heated to 110° C., and then coated on an OHP sheet (PP-2500, available from Sumitomo 3M Limited) using a wire-wound rod (winding wire diameter: 0.9 mm), which was coated together with the same ink composition as the above but not stored. Color difference between both the ink films thus formed was measured using a multi-light-source spectroscopic colorimeter (MSC-5N, manufactured by Suga Shikenki K.K.) to find that ΔE was 15.16 in the L*a*b* color system.

The ink composition thus prepared was melted on a hot plate heated to 110° C., and then coated on an OHP sheet (PP-2500, available from Sumitomo 3M Limited) using a wire-wound rod (winding wire diameter: 0.9 mm). As a result, a transparent ink film with a sharp color was obtained. Its transparency was measured using a hazometer (manufactured by Suga Shikenki K.K.) to find that it was 11.6%.

The above ink composition was set in a hot-melt ink-jet printer to print images. As a result, sharp printed images were obtained on recording paper without causing any clogging of the printer head. When printed on OHP sheets, however, prints having a good transparency were obtained.

The entire disclosure of Japanese Patent Application No.8-184415 filed on Jul. 15, 1996 including the specification, claims, FIGURE and summary is incorporated by reference in its entirety.

What is claimed is:

1. A hot-melt ink composition which is solid at room temperature, comprising a wax component having a melting point of about 50° C. or above, an amide resin and a colorant; wherein said wax component has at least one ketone wax, and the ketone wax is contained in an amount of from 20% to less than 50% by weight in the hot-melt ink composition.

2. The hot-melt ink composition according to claim 1, wherein said wax component has a melting point of from 50° C. to 150° C.

3. The hot-melt ink composition according to claim 1, wherein said wax component is contained in an amount of from 5% by weight to 95% by weight in the hot-melt ink composition.

4. The hot-melt ink composition according to claim 1, wherein said ketone wax is at least one of stearone and laurone.

5. The hot-melt ink composition according to claim 1, wherein said wax component further has a wax selected from the group consisting of a petroleum wax, a vegetable wax, an animal wax, a mineral wax, a synthetic hydrocarbon wax, a hydrogenated wax, a modified wax, a higher fatty acid wax, a higher alcohol wax, an ester wax and a polymer wax.

6. The hot-melt ink composition according to claim 1, wherein said amide resin has a weight average molecular weight of from 500 to 500,000.

7. The hot-melt ink composition according to claim 1, wherein said amide resin is contained in an amount of from 5% by weight to 60% by weight in the hot-melt ink composition.

8. The hot-melt ink composition according to claim 1, wherein said colorant comprises a pigment selected from the group consisting of carbon black, cadmium red, molybdenum red, chromium yellow, cadmium yellow, titanium yellow, chromium oxide, viridian, titanium cobalt green, ultramarine blue, Prussian blue, cobalt blue, an azo pigment, a phthalocyanine pigment, a quinacridone pigment, an isoindolinone pigment, a dioxadine pigment, a threne pigment, a perylene pigment, a perynone pigment, a thioindigo pigment, a quinopthalone pigment and a metal complex pigment.

9. The hot-melt ink composition according to claim 1, wherein said colorant comprises an oil-soluble dye selected from the group consisting of an azo dye, a metal complex dye, a naphthol dye, a anthraquinone dye, a indigo dye, a carbonium dye, a quinoneimine dye, a xanthene dye, a cyanine dye, a quinoline dye, a nitro dye, a nitroso dye, a benzoquinone dye, a naphthoquinone dye, a penoline dye and a phthalocyanine dye.

10. The hot-melt ink composition according to claim 1, wherein said colorant is contained in an amount of from 0.1% by weight to 10% by weight in the hot-melt ink composition.

11. An ink-jet recording process comprising jetting a hot-melt ink composition to a recording medium in the form of droplets to make a record; said hot-melt ink composition being solid at room temperature and comprising a wax component having a melting point of about 50° C. or above, an amide resin and a colorant; wherein said wax component has at least one ketone wax, and the ketone wax is contained in an amount of from 20% to less than 50% by weight in the hot-melt ink composition.

12. The ink-jet recording process according to claim 11, wherein said hot-melt ink composition is jetted in the form of droplets by utilizing the vibration of a piezoelectric device.

13. The hot-melt ink composition according to claim 1, wherein said ketone wax is contained in an amount of from 20% to 48% by weight in the hot-melt ink composition.

14. The hot-melt ink composition according to claim 1, wherein said ketone wax is contained in an amount of from 20% to 45% by weight in the hot-melt ink composition.

* * * * *